United States Patent [19]

Malito et al.

[11] Patent Number: 5,286,391
[45] Date of Patent: Feb. 15, 1994

[54] RED MUD FLOCCULATION

[75] Inventors: John T. Malito, Oswego; Michael G. Strominger, Dekalb, both of Ill.

[73] Assignee: Nalco Chemical Company, Naperville, Ill.

[21] Appl. No.: 13,524

[22] Filed: Feb. 4, 1993

[51] Int. Cl.$^5$ .................................................. C02F 1/56
[52] U.S. Cl. .................................. 210/733; 210/732; 210/734; 423/121; 423/122; 423/127
[58] Field of Search .................. 210/732, 733, 734; 423/121, 122, 127

[56] References Cited

U.S. PATENT DOCUMENTS

| | | |
|---|---|---|
| Re. 28,474 | 7/1974 | Anderson et al. |
| 3,284,393 | 11/1966 | Vanderhoff et al. |
| 3,975,496 | 8/1976 | Smalley et al. .................. 210/734 |
| 4,283,507 | 8/1981 | Phillips et al. .................. 525/369 |
| 4,545,902 | 10/1985 | Connelly et al. |
| 4,678,585 | 7/1987 | Brownrigg .................. 210/734 |
| 4,717,550 | 1/1988 | Spitzer et al. .................. 210/736 |
| 5,041,269 | 8/1991 | Moody et al. .................. 210/734 |

*Primary Examiner*—Neil M. McCarthy
*Attorney, Agent, or Firm*—Joan I. Norek; Robert A. Miller; Joseph B. Barrett

[57] ABSTRACT

A process for improving the flocculation of suspended solids in a Bayer process liquor in a primary settler stage. The method includes the step of adding to a primary settler feed from about 1 to about 100 parts per million of a composition including a non-inverted, water-continuous polymer, said polymer being hydrolyzable in a Bayer process liquor to an acid form, said acid form being an active red mud flocculant.

19 Claims, No Drawings

RED MUD FLOCCULATION

BACKGROUND OF THE INVENTION

1. Field of the Invention

The present invention is directed to the clarification of red mud-containing liquors; particularly the primary settler liquor generated in the Bayer process for the recovery of alumina from bauxite ore.

2. Description of the Prior Art

In the Bayer process for the production of alumina, bauxite ore is pulverized, slurried in water, and then digested with caustic at elevated temperatures and pressures. The caustic solution dissolves oxides of aluminum, forming an aqueous sodium aluminate solution. The caustic-insoluble constituents of bauxite ore (referred to as "red mud") are then separated from the aqueous phase containing the dissolved sodium aluminate. Solid alumina trihydrate is precipitated out of the solution and collected as product.

In more detail, the pulverized bauxite ore is fed to a slurry mixer where a water slurry is prepared. The slurry makeup water is typically spent liquor (described below) and added caustic. This bauxite ore slurry is then diluted and passed through a digester or a series of digesters where, under high pressure and temperature, about 98% of the total available alumina is released from the ore as caustic-soluble sodium aluminate. After digestion, the slurry then passes through several flash tanks wherein the pressure of the digested slurry is reduced from several atmospheres to one atmosphere and the temperature of the slurry is reduced from about 400° F. to about 220° F.

The aluminate liquor leaving the flashing operation contains from about 1 to about 20 weight percent solids, which solids consist of the insoluble residue that remains after, or is precipitated during, digestion. The coarser solid particles may be removed from the aluminate liquor with a "sand trap" cyclone. The finer solid particles are generally separated from the liquor first by settling and then by filtration, if necessary. Any Bayer process slurry taken from the digesters through any subsequent dilution of the slurry, including the flash tanks, but before the primary settler, is referred hereinafter as the primary settler feed. The slurry of aluminate liquor leaving the flash tanks is diluted by a stream of recycled wash overflow liquor.

Normally, the primary settler feed is thereafter fed to the center well of the primary settler, where it is treated with a flocculant. As the mud settles, clarified sodium aluminate solution, referred to as "green" or "pregnant" liquor, overflows a well at the top of the primary settler and is collected. This overflow from the primary settling tank is passed to the subsequent process steps.

The clarity of the primary settler overflow is crucial to the efficient processing of alumina trihydrate. If the aluminate liquor overflowing the settler contains an unacceptable concentration of suspended solids (at times from about 10 to about 5,000 mg of suspended solids per liter), it must be further clarified by filtration to give a filtrate with no more than about 10 mg suspended solids per liter of liquor. The treatment of the liquor collected after the primary settlement to remove any residual suspended solids before alumina trihydrate is recovered is referred to as a secondary clarification stage.

The clarified sodium aluminate liquor is seeded with alumina trihydrate crystals to induce precipitation of alumina in the form of alumina trihydrate, $Al(OH)_3$. The alumina trihydrate particles or crystals are then separated from the concentrated caustic liquor, and the remaining liquid phase, the spent liquor, is returned to the initial digestion step and employed as a digestant after reconstitution with caustic.

In another section of the Bayer circuit, the settled solids of the primary settler ("red mud") are withdrawn from the bottom of the settler ("underflow") and passed through a countercurrent washing circuit for recovery of sodium aluminate and soda. Overflow water from this washing circuit is recycled as primary settler feed and dilutes the slurry as it leaves the flash tanks. The efficient recovery of soda and sodium aluminate is one important way operators reduce costs and increase production.

The partial separation of the red mud solids from the pregnant liquor in the primary settler is expedited by the use of a flocculant. This initial clarification of the pregnant liquor is referred to as the primary settler stage. Flocculating agents, such as inverted latex polymers and starch, improve the separation of insolubles by increasing the rate at which the solids settle, by reducing the amount of residual solids suspended in the liquor, and by decreasing the amount of liquor in the settled solids phase. Flocculation performance is highly important in the primary settlement stages. Red muds are comprised chiefly of iron oxides (at least about 50 weight percent of the red mud solids), together with silicon oxides, calcium oxides, sodium alumino-silicates, titanium oxides and other material, and commonly represent from about 5 to about 50 weight percent of the materials of the bauxite ore. Generally these muds are comprised of very fine particles, which hinder the desired rapid and clean separation of red mud particles from the solubilized alumina liquor. If the rate of separation is slow, output is materially diminished and overall process efficiency is impaired. If the separation is not clean, the resultant solubilized aluminate liquor will require a more extensive treatment to remove residual solids, and/or the alumina trihydrate recovered will contain levels of impurities that are undesirably high for many end-uses.

Starch and inverted latex polymers are used to flocculate the suspended red mud. These flocculating agents are added in the primary settler. Starch is added to improve the clarity of the liquor overflow. However, starch disadvantageously produces a red mud which has poor rheology, and, hence, has undesirable underflow characteristics. In more detail, the red mud is removed to a wash stage via an underflow mechanism. In the wash stage, sodium aluminate and soda are recovered from this red mud. When starch is used, a mud is produced which has poor rheology and poor underflow characteristics. If not diluted, the underflow will damage plant equipment. To overcome this problem, operators have decreased the percent solids in the underflow to make it more manageable. This, however, deceases the efficiency of the soda and sodium aluminate recovery in the wash stage.

When latex polymers are used, the latex polymers must be diluted either at the process facility or prior to shipping. If the latex polymers are diluted prior to shipping, shipping costs are dramatically increased. If the latex polymers are diluted at the processing facility, equipment must be available at the facility to perform the dilution. Furthermore, other than the dilution step, the latex polymers must be inverted prior to application so that the latex polymers are contained in the water phase of the emulsion. If latex polymers are added neat (non-inverted), the non-inverted, oil phase latex polymers will not disperse in the Bayer liquor, and the oil phase will plug injection equipment. Accordingly, in light of the above problems with latex polymers, it would be advantageous to either eliminate the need for latex polymers or decrease the amount of latex polymers needed to adequately flocculate red mud solids in a Bayer process liquor.

Accordingly, it would be advantageous to provide a new flocculating agent which would expedite the separation of the red mud solids from the pregnant liquor, increase the clarity of liquor overflow, decrease latex flocculant usage, and eliminate starch.

SUMMARY OF THE INVENTION

The present invention provides a composition and method for improved flocculation of Bayer process red mud-containing liquors, particularly the primary settler liquors. The invention provides a method for improving the flocculation of suspended solids in a Bayer process liquor in a primary settler stage, the method including the step of adding to the primary settler feed from about 1 to about 100 parts per million of a composition including a non-inverted, water-continuous polymer, said polymer being hydrolyzable in a Bayer process liquor to an acid from, said acid form being an active red mud flocculant. The polymer is preferably a homopolymer of a poly-acrylic acid ester, or a copolymer of acrylic acid ester and acrylamide. The polymer can be added to the Bayer process liquor as it enters a flash tank, in a digester or in the recycle wash stream.

DESCRIPTION OF THE PREFERRED EMBODIMENTS

The Bayer process liquors generally are aqueous media containing dissolved sodium aluminate and red mud solids at various concentrations. Such liquors include the primary settler slurry or feed, which contains high concentration levels of both red mud and dissolved sodium aluminate, the red mud washing slurries, which have high red mud concentrations but lesser concentrations of sodium aluminate and total alkalinity, and the secondary clarification liquors, which are rich in dissolved sodium aluminate but contain much less red mud than the other types of liquors. As discussed above, the separation of the red mud from the sodium aluminate and its aqueous phase is continued from the primary settlement stage until concentrated red mud is eliminated from the process circuit, and from the primary settlement stage until the clarified liquor is subjected to the alumina trihydrate crystallization.

The flocculation of red mud, which routinely precedes either settling or filtration, is most difficult in the primary settlement stage because of the high concentration of fine particles, and the high concentration of total alkalinity. Improvement of the flocculation effectiveness in the primary settlement stage is extremely important to the entire Bayer process. By reducing the level of suspended solids that remain in the supernatant above the floc formed in the primary settler liquor, the solids to be removed during secondary clarification stages are diminished.

In the Bayer process, the bauxite ore is digested under highly alkaline conditions, and the typical primary settler liquors are routinely highly alkaline, containing sodium or calcium hydroxide, sodium aluminate, and commonly sodium carbonate. The total alkalinity of the primary settler feed, that is the liquor charged to the primary settlement stage, is typically from about 100 to 300 grams per liter of settler feed, as sodium carbonate. The solids contents of typical primary settler feeds vary from about 25 or 30 grams per liter of settler feed to about 80 or 85 grams per liter of settler feed.

By primary settler feed is meant herein the Bayer process digested slurry as charged to the flash tanks or other vessels emptying into the primary settler. Such feed may be an admixture of the digested slurry plus dilution liquor, and the dilution liquor is routinely the counter current technique wash water from the red mud washing stages discussed above. The primary settler feed differs from the liquors or slurries subjected to clarification and/or separation in the secondary clarification stage or the red mud washing stages by composition as to the solids content, dissolved sodium aluminate content, and total alkalinity. The primary settler feed also differs from the liquors or slurries subjected to clarification and/or separation in the secondary clarification stage or the red mud washing stages in that no insoluble fraction thereof has received an earlier flocculation treatment. An improved clarification of Bayer process primary settler liquors is the principle object of the present invention. Nonetheless in broad embodiment the present invention in directed to the clarification of red mud-containing liquors, particulary the counter-current wash liquors in addition to the primary settler liquors of the Bayer process.

Upon flocculation of a primary settler feed, using the polymers of the invention, a clear liquor/mud interface will form, and will gradually settle, providing a clear liquor supernatant layer overlying a mud layer. The lower mud layer contains the flocculated material, and as discussed above is comprised of both red mud solids and some amount of pregnant liquor. The overlying supernatant is the liquor that is separated for secondary clarification, again as discussed above. This supernatant is "mud-clear" and the interface between it and the mud layer is clearly seen in some cases, but the supernatant is not entirely free of suspended solids, appearing instead as a hazy, but transparent, liquid. The present invention diminishes the amount of suspended solids in such supernatant, and hence decreases the extent of secondary clarification required to obtain a given purity of sodium aluminate solution.

The digested slurry is typically discharged from the flash tanks at elevated temperatures. The primary settler feed is generally not further cooled before charging to the primary settlement stage other than the cooling which may occur when a digested slurry is optionally admixed with the liquor from the first red mud wash stage to form a primary settler feed. According to the invention, the flocculation of the primary settler feed is conducted at atmospheric pressures and at elevated temperatures of from about 80° or 90° C. to about 105° or 115° C.

According to one broad aspect of the invention, the invention involves the use of a polymer which, when placed in a Bayer process liquor, hydrolyzes to form an acid which is an active red mud flocculant. Examples of such polymers are polyacrylamide and substituted alkylacrylamides, which hydrolyze to form the polyacrylic acid, polyvinyl acetate, which upon hydrolysis produces a polyvinyl alcohol, polyacrylonitrile which also hydrolyzes to form a polyacrylic acid, and polyacrylic acid esters.

Referring to the polyacrylic acid esters of the invention, the alkyl esters include those made from acrylic acid and alcohols having from 1 to about 10 carbons. The alkyl ester can be a straight or branched chain, and may contain aliphatic and/or aromatic groups. In one embodiment of the invention, the ester is a methyl ester. Apart from the use of homopolymers, copolymers or even terpolymers of the above could also be useful in the practice of the invention. Copolymers of acrylic acid and acrylamide copolymers of acrylic acid esters and acrylic acid or acrylamide may be used according to the invention. Essentially any combination of the monomers forming the homopolymer above listed can be used as copolymers or terpolymers of the invention.

According to one preferred embodiment of the invention, polymers including polyacrylic acid ester monomers ranging in composition from essentially 100% mer units of the acrylic acid ester monomer down to less than 50% mer units of acrylic acid ester monomer are used. Preferably, the molecular weights range from about 10,000 to about 20,000,000 daltons. More preferable, the molecular weight is from 1,000,000 to about 10,000,000 daltons. One feature of the polymers of the invention is the high molecular weights which produce high reduced specific viscosity (RSV) in the range of from 30 up to 60.

The polymers of the invention are non-inverted, water continuous. In more detail, the polymers are dispersed in water, where water is the continuous phase. This directly contrasts what is found in latex polymers where the polymer is dispersed in an oil phase and an inversion is required before the polymers can be used as flocculants. According to the invention, the polymers are added to the primary liquor feed of a Bayer process neat. For purposes of the invention, neat means a polymer in a water dispersed form which can contain from 20 to 40% active polymer. Therefore, polymer is added in a very high concentration to the primary liquor feed. In the prior art, latexes are first inverted and again diluted to about 1% actives, or less. Therefore, by neat addition, it is intended to mean the addition of the polymer as it is essentially manufactured without prior dilution.

One advantage of the neat addition of the polymers of the invention is overall reduction in the use of polymer, an improved overall flow clarity, and improved red mud under flow characteristics. One unique feature of the invention is that the water continuous polymers of the invention hydrolyze in situ in the Bayer process liquor itself. In more detail, the polyacrylic acid esters are not red mud flocculants and as such are essentially inert. However, when placed in the Bayer process liquor in the presence of red mud, the high alkalinity and the high temperatures hydrolyze the ester to form polymer acrylic acid ultimately. Furthermore, the composition of the invention does not hydrolyze instantly, but, over time. Therefore, the polyacrylic acid ester essentially is being activated continuously, ranging from the initial inert composition which is 100% ester down to eventually 100% active polyacrylic acid.

The present invention produces its surprising and unexpected results through the formation of micro-floccules of the polymer and the suspended solids. This forms a red mud which is more amenable to the bulk flocculation in the primary settler. The micro-floccules form as the polymers hydrolyze and become active toward the red mud. This is why, according to the invention, the polymers are injected upstream from the primary settler, preferably in one of the flash tanks where there is sufficient temperature and residence time to allow the hydrolysis of the polymer. It should be noted that hydrolysis is not instantaneous. The hydrolysis will progress as the polymer and mud make their way through the flash tanks down the various piping and into the primary settler.

According to one embodiment of the invention, the invention is practiced as follows. The polymer is injected into the primary settler feed, preferably into one of the lines upstream from the primary settler or, preferably, in a flash tank where there is sufficient temperature. Also, the polymer can be added in the digesters themselves.

The following examples are presented to describe preferred embodiments and utilities of the invention and are not meant to limit the invention unless otherwise stated in the claims appended hereto.

EXAMPLE 1

Synthesis of Water Continuous Polymers

The monomers methylacrylate and acrylic acid in various mole ratios ranging from 100% methylacrylate to 50/50 of acrylic acid and methylacrylate would be emulsified in water in the presence of surfactants. Typical surfactants found to work well are the sodium dodecylbenzene sulphonate and an ammonium salt of a lower alcohol containing 12 moles of ethylene oxide. Other surfactants having similar hydrophile-lipophile balances are believed to also be useful. Once the monomers have been emulsified in the water continuous phase, it is now only necessary to initiate the polymerization reaction. This is done using a redox couple and the preferred initiators are the t-butyl hydroperoxide, and sodium formaldehyde sulfoxylate in an iron ethylenediaminetetraacetic acid complex.

Typical polymerization formulas for making the polymers of the invention are as follows in weight percents: 51% water; 6.7% of the ammonium salt of the lower alcohol containing 12 moles of ethylene oxide; 1% of a 0.1% solution of t-butyl hydroperoxide; 1% of a 0.01% solution of sodium formaldehyde sulphoxylate; 0.43% of a 1% solution of iron ethylenediaminetetraacetic acid complex; 2% acrylic acid; and 38% methylacrylate.

In more detail, the two surfactants are charged into water in an appropriate vessel, purged with nitrogen to remove all traces of oxygen. The vessel's temperature is controlled to between 10° and 30° C. Once the system has come to the desired temperature and is thoroughly purged with nitrogen, both monomers are added with mixing. The initiators are then added over a period of 1-5 hours during which time reaction ensues. Considerable heat is generated and the reaction may be controlled by removing heat using a condensor or cooler or chiller as required. The reaction takes 1-5 hours and typically results in a conversion of about 70 to 85% of the monomers. Better conversion rates can be achieved by adding more initiator and continuing the reaction for an extended time. Following the reaction, the excess monomer is stripped by vacuum distillation, typically at 40 millimeters of mercury and using a temperature of 95°-130° F.

Changes can be made in the composition, operation and arrangement of the method of the present invention described herein without departing from the concept and scope of the invention as defined in the following claims:

We claim:

1. A process for improving the flocculation of suspended solids in a Bayer process liquor in a primary settler stage, the method comprising:
   adding to a primary settler feed from about 1 to about 100 parts per million of a composition including a water-continuous dispersion containing a polymer dispersed in the water of the continuous phase of said dispersion, said polymer comprised of at least 50 mole percent of mer units having pendent groups that hydrolyze to pendant carboxylic acid groups and wherein said dispersion contains at least about 20 weight percent of said polymer; and
   flocculating red mud in said primary settler feed in a primary settler,
   wherein a sufficient amount of said pendant groups of said mer units of said polymer hydrolyze to carboxylic acid groups between the time of said addition and the time of said flocculation that said polymer as so hydrolyzed is active as a red mud flocculant in said primary settler stage.

2. The method of claim 1 wherein said polymer as added to said primary settler feed is a homopolymer of an acrylic acid ester.

3. The method of claim 1 wherein said polymer as added to said primary settler feed is a copolymer comprised of an acrylic acid ester and acrylamide.

4. The method of claim 1 wherein the primary settler feed is further defined as the Bayer process liquor as it enters a flash tank.

5. The method of claim 1 wherein the primary settler feed is further defined as recirculated wash liquor.

6. The method of claim 1 wherein said polymer as added to said primary settler feed is comprised of at least 50 mole percent of acrylic acid ester formed from an alcohol having from 1 to about 10 carbons.

7. The method of claim 1 wherein said polymer as added to said primary settler feed is a homopolymer of acrylic acid ester formed from an alcohol having from 1 to about 10 carbons.

8. The method of claim 1 wherein said polymer as added to said primary settler feed is comprised of at least 50 mole percent of acrylic acid ester formed from an alcohol having from 1 to about 10 carbons, and has a molecular weight of from about 10,000 to about 20,000,000 daltons.

9. The method of claim 1 wherein said polymer as added to said primary settler feed is comprised of at least 50 mole percent of acrylic acid ester formed from an alcohol having from 1 to about 10 carbons, and has a molecular weight of from 1,000,000 to about 10,000,000.

10. The method of claim 1 wherein said polymer as added to said primary settler feed is comprised of at least 50 mole percent of acrylic acid ester formed from an alcohol having from 1 to about 10 carbons, and has a reduced specific viscosity of from 30 to 60.

11. The method of claim 1 wherein said dispersion contains from about 20 to about 40 weight percent of said polymer.

12. The method of claim 1 wherein said polymer is added to said primary settler feed when said primary settler feed is in a line upstream of said primary settler.

13. A process for improving the flocculation of red mud in a red-mud containing Bayer process liquor, comprising:
   adding to a red-mud containing Bayer process liquor from about 1 to about 100 parts per million of a composition including a water-continuous dispersion containing a polymer dispersed in the water of the continuous phase of said dispersion, said polymer comprised of at least 50 mole percent of acrylic acid ester mer units; and wherein said dispersion contains at least about 20 weight percent of said polymer and
   flocculating red mud in said Bayer process liquor,
   wherein a sufficient amount of said acrylic acid ester mer units of said polymer hydrolyze to carboxylic acid groups between the time of said addition and the time of said flocculation that said polymer as so hydrolyzed is active as a red mud flocculant in said flocculation.

14. The method of claim 13 wherein said polymer as added to said red-mud containing Bayer process liquor is comprised of at least 50 mole percent of acrylic acid ester formed from an alcohol having from 1 to about 10 carbons.

15. The method of claim 13 wherein said polymer as added to said red-mud containing Bayer process liquor is a homopolymer of acrylic acid ester formed from an alcohol having from 1 to about 10 carbons.

16. The method of claim 13 wherein said polymer as added to said red-mud containing Bayer process liquor is comprised of at least 50 mole percent of acrylic acid ester formed from an alcohol having from 1 to about 10 carbons, and has a molecular weight of from about 10,000 to about 20,000,000 daltons.

17. The method of claim 13 wherein said polymer as added to said red-mud containing Bayer process liquor is comprised of at least 50 mole percent of acrylic acid ester formed from an alcohol having from 1 to about 10 carbons, and has a molecular weight of from 1,000,000 to about 10,000,000.

18. The method of claim 13 wherein said polymer as added to said red-mud containing Bayer process liquor is comprised of at least 50 mole percent of acrylic acid ester formed from an alcohol having from 1 to about 10 carbons, and has a reduced specific viscosity of from 30 to 60.

19. The method of claim 13 wherein said dispersion contains from about 20 to about 40 weight percent of said polymer.

* * * * *